United States Patent [19]
Virkar et al.

[11] Patent Number: 6,106,967
[45] Date of Patent: Aug. 22, 2000

[54] PLANAR SOLID OXIDE FUEL CELL STACK WITH METALLIC FOIL INTERCONNECT

[75] Inventors: Anil V. Virkar; Jai-Woh Kim, both of Salt Lake City, Utah; Kuan-Zong Fung, Tainan, Taiwan

[73] Assignee: Gas Research Institute, Chicago, Ill.

[21] Appl. No.: 09/332,237

[22] Filed: Jun. 14, 1999

[51] Int. Cl.$^7$ .................................................. H01M 08/12
[52] U.S. Cl. ................ 429/34; 429/35; 429/38; 429/30; 429/18; 429/32
[58] Field of Search .................... 429/34, 38, 30, 429/35, 18, 39, 32, 36

[56] References Cited

U.S. PATENT DOCUMENTS

| | | |
|---|---|---|
| Re. 34,213 | 4/1993 | Hsu . |
| 3,394,032 | 7/1968 | Danner ..................................... 136/86 |
| 3,785,867 | 1/1974 | Edwards et al. . |
| 4,588,661 | 5/1986 | Kaufman et al. ........................ 429/36 |
| 4,761,349 | 8/1988 | McPheeters et al. . |
| 5,085,950 | 2/1992 | Primdahl . |
| 5,238,754 | 8/1993 | Yasuo et al. . |
| 5,258,240 | 11/1993 | Di Croce et al. . |
| 5,292,600 | 3/1994 | Kaufman . |
| 5,298,342 | 3/1994 | Laurens et al. . |
| 5,445,904 | 8/1995 | Kaufman . |
| 5,496,655 | 3/1996 | Lessing . |
| 5,935,727 | 8/1999 | Chiao ....................................... 429/32 |
| 5,993,986 | 8/1999 | Wallin et al. ............................ 429/32 |

*Primary Examiner*—Maria Nuzzolillo
*Assistant Examiner*—Raymond Alejandro
*Attorney, Agent, or Firm*—Pauley Petersen Kinne & Fejer

[57] ABSTRACT

A solid oxide fuel cell stack having a plurality of integral component fuel cell units, each integral component fuel cell unit having a porous anode layer, a porous cathode layer, and a dense electrolyte layer disposed between the porous anode layer and the porous cathode layer. The porous anode layer forms a plurality of substantially parallel fuel gas channels on its surface facing away from the dense electrolyte layer and extending from one side to the opposite side of the anode layer, and the porous cathode layer forms a plurality of substantially parallel oxidant gas channels on its surface facing away from the dense electrolyte layer and extending from one side to the opposite side of the cathode. A flexible metallic foil interconnect is provided between the porous anode and porous cathode of adjacent integral component fuel cell units.

20 Claims, 2 Drawing Sheets

PLANAR SOLID OXIDE FUEL CELL STACK WITH METALLIC FOIL INTERCONNECT

BACKGROUND OF THE INVENTION

1. Field of the Invention

This invention relates to a solid oxide fuel cell stack which utilizes metallic foils as interconnects, thereby eliminating the need for glass seals used in conventional solid oxide fuel cell stack systems. In addition to eliminating the need for glass seals between fuel cell units of the fuel cell stack, the stacks can be subjected to rapid variations in temperature without cracking, and thermal expansion match between components is not required in contrast to known solid oxide fuel cell stack designs.

2. Description of Prior Art

Fuel cell systems are known and used for the direct production of electricity from standard fuel materials including fossil fuels, hydrogen, and the like. Fuel cells typically include a porous anode, a porous cathode, and a solid or liquid electrolyte therebetween. Fuel materials are directed along and in contact with the anode of the fuel cell system, while an oxidizing gas, for example air or oxygen, is allowed to pass along and in contact with the cathode of the system. As a result, the fuel is oxidized, with the oxidizing gas being reduced in order to generate electricity. The electrolyte is designed to allow charge transfer between the anode and the cathode.

Solid oxide fuel cells have attracted considerable attention as the fuel cells of the third generation following phosphoric acid fuel cells and molten carbonate fuel cells of the first and second generations, respectively. Solid oxide fuel cells have an advantage in enhancing efficiency of generation of electricity, including waste heat management, with their operation at high temperature, above about 650° C. However, because a single fuel cell unit only produces an open circuit voltage of about one volt and each cell is subject to electrode activation polarization losses, electrical resistance losses, and ion mobility resistant losses which reduce its output to even lower voltages at a useful current, a fuel cell stack comprising a plurality of fuel cell units electrically connected to each other to produce the desired voltage or current is required. Planar solid oxide fuel cell stacks typically comprise a plurality of stacked cathode-electrode-anode-interconnect repeat units. Channels for gas flow, either in a cross-flow or a co-flow or a counterflow configuration, are usually incorporated into the interconnect. In order to permit the transport of gases through the channels, known interconnects are usually at least 1.5 to 2 mm in thickness. As a consequence, both the cell and the interconnect, whether of ceramic or metallic material, are rigid. As a result, to achieve an effective seal, the mating surfaces between the cell and the interconnect must be flat and parallel. In addition, because all of the components are rigid, even with good flatness, it is usually necessary to use a glass material for sealing. Solid oxide fuel cell systems are taught, for example, by U.S. Pat. No. 5,238,754 to Yasuo et al.; U.S. Pat. No. 5,258,240 to Di Croce et al.; U.S. Pat. No. 4,761,349 to McPheeters et al.; and Re. 34,213 to Hsu.

SUMMARY OF THE INVENTION

Accordingly, it is one object of this invention to provide a solid oxide fuel cell stack which eliminates the need for glass seals between individual cell units and the interconnects disposed therebetween.

It is another object of this invention to provide a solid oxide fuel cell stack which can be subjected to rapid variations in temperature without cracking.

It is yet another object of this invention to provide a solid oxide fuel cell stack for which thermal expansion match between components thereof is not required.

These and other objects of this invention are achieved by a solid oxide fuel cell stack comprising a plurality of integral component fuel cell units, each of which comprises a porous anode layer, a porous cathode layer, and a dense electrolyte layer disposed between the porous anode layer and the porous cathode layer. An interconnect disposed between the porous anode and the porous cathode of adjacent integral component fuel cell units is a flexible metallic foil preferably having a thickness in the range of about 1 mil (25 microns) to about 10 mils (250 microns) and made of a superalloy material. In accordance with one preferred embodiment, the porous anode layer forms a plurality of substantially parallel fuel gas channels on an anode surface facing away from the dense electrolyte layer and extending from a first anode side of the porous anode layer to an opposite anode side thereof. In addition, the porous cathode layer forms a plurality of substantially parallel oxidant gas channels on a cathode surface facing away from the dense electrolyte layer and extending from a first cathode side of the porous cathode layer to the opposite cathode side thereof. The fuel gas channels are in communication with a fuel gas manifold which supplies fuel gas to the fuel cell stack and the oxidant gas channels are in communication with an oxidant gas manifold which provides oxidant to the fuel cell stack.

BRIEF DESCRIPTION OF THE DRAWINGS

These and other objects and features of this invention will be better understood from the following detailed description taken in conjunction with the drawings wherein.

DESCRIPTION OF PREFERRED EMBODIMENTS

Figure 1:
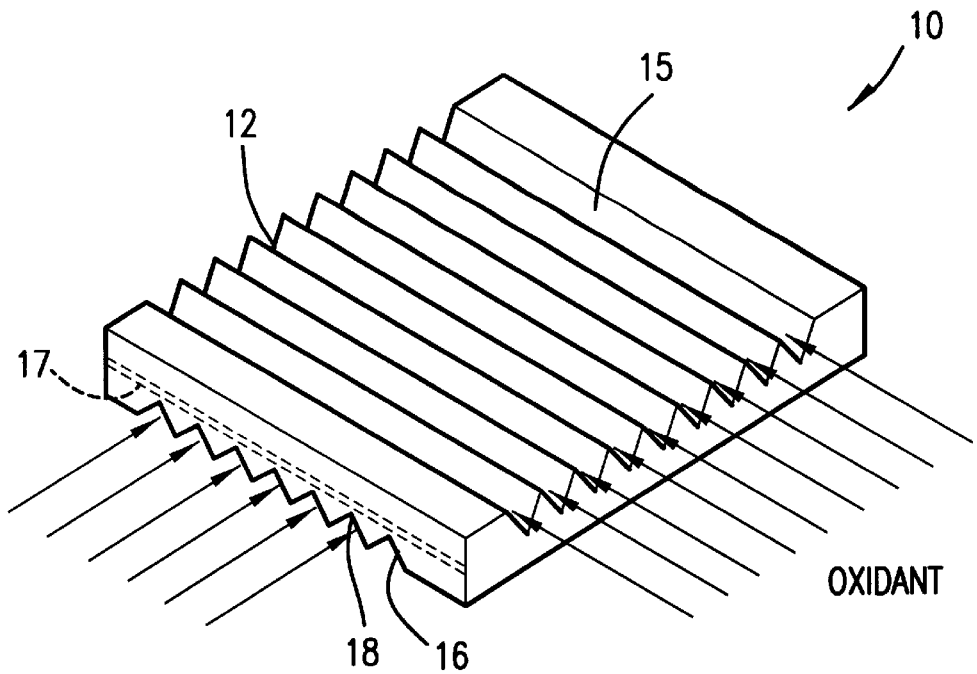
FIG. 1 is a schematic diagram of an integral component fuel cell unit comprising the solid oxide fuel cell stack of this invention.

FIG. 1 is a schematic diagram showing a single fuel cell unit suitable for use in the planar solid oxide fuel cell stack of this invention. Fuel cell unit 10, as shown, is an integral component comprising a relatively thick porous anode 16, a somewhat thicker porous cathode 15 (but much thinner than the anode), and a thin dense electrolyte 17 sandwiched therebetween. The fuel cell unit in accordance with this invention is quite rigid. In contrast to known fuel cell units whereby channels for gas flow are formed by the interconnect between fuel cell units comprising the fuel cell stack, the porous cathode 15 forms a plurality of substantially parallel oxidant gas flow channels 12 on a face of porous cathode 15 facing away from electrolyte 17 and porous anode 16 forms a plurality of fuel gas channels 18 on a face of porous anode 16 facing away from electrolyte 17. In accordance with one preferred embodiment of this invention, as shown in FIG. 1, oxidant gas channels 12 extend from one side or edge of porous cathode 15 to an opposite edge and fuel gas channels 18, perpendicularly disposed with respect to oxidant gas channels 12, extend from one side or edge of porous anode 16 to an opposite edge. Because the oxidant gas channels 12 and fuel gas channels 18 are incorporated into the integral component fuel cell unit, the interconnect for electrically connecting one integral component fuel cell unit 10 to an adjacent integral component fuel cell unit in a fuel cell stack need not be bulky.

Figure 2:
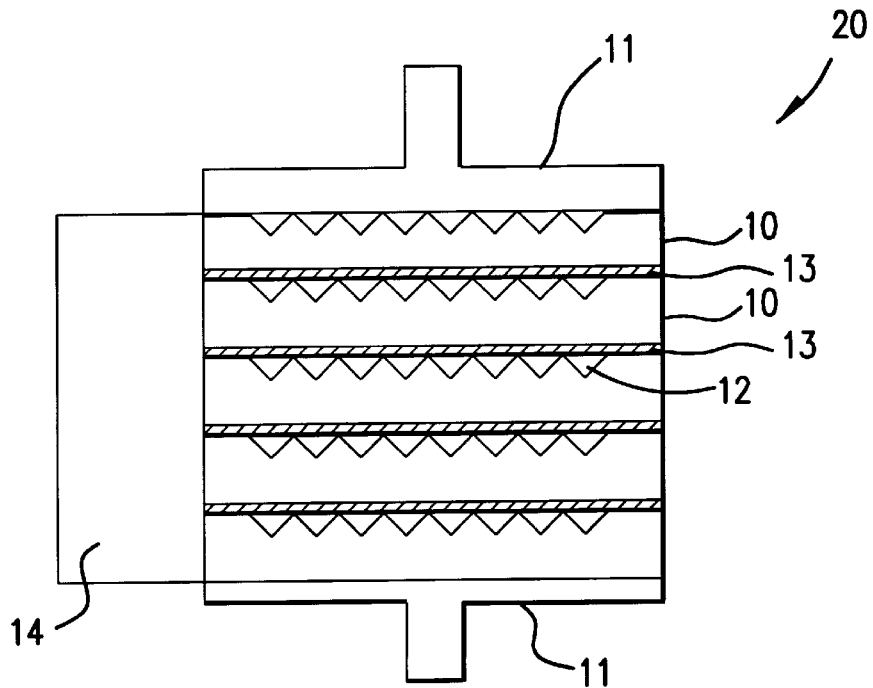
FIG. 2 is a schematic diagram of a five-cell solid oxide fuel cell stack in accordance with one embodiment of this invention.

FIG. 2 is a schematic diagram showing a five fuel cell unit solid oxide fuel cell stack in accordance with one embodiment of this invention. Fuel cell stack 20 comprises a plurality of integral component fuel cell units 10 with a thin, flexible metal foil interconnect 13 disposed between adjacent fuel cell units 10. To provide fuel and oxidant gases to the respective fuel gas channels and oxidant gas channels, gas manifolds 14, only one of which is shown for simplicity, are in communication with fuel gas channels 18 and oxidant gas channels 12 to provide the requisite fuel gas to the porous anode 16 and oxidant gas to the porous cathode 15 of each integral component fuel cell unit 10 of solid oxide fuel cell stack 20.

The use of a flexible metal foil as interconnect 13 in accordance with the solid oxide fuel cell stack of this invention provides many advantages over traditional interconnects. In particular, the use of a flexible metal foil facilitates sealing between interconnect 13 and each integral component fuel cell unit 10 under a slight compressive stress without the necessity of a glass seal. Because the foil interconnect is metallic and thin, some amount of plastic deformation readily occurs under compression, thereby allowing for good sealing. In addition, a flexible foil insures a good electrical contact between the integral component fuel units 10 and the interconnects 13. In accordance with a particularly preferred embodiment of this invention, the flexible metallic foil interconnect has a thickness in the range of about 1 mil to about 10 mils (25 microns–250 microns). In accordance with a particularly preferred embodiment of this invention, the metallic foil interconnect has a thickness of about 5 mils.

Because there is no glass seal as in conventional solid oxide fuel cell stacks, the entire fuel cell stack of this invention is not a rigid mass, unlike a glass-sealed stack. As a result, the solid oxide fuel cell stack of this invention can be subjected to rapid variations in temperature without the fear of cracking due to thermal stresses. The individual fuel cell units are quite sturdy and are thermally shock resistant due to the presence of a large amount of nickel in the anode, the thickest part of the integral component fuel cell unit. In addition, because the interconnect is a flexible metallic foil which readily deforms, thermal expansion matching is not a requirement, in contrast to known designs which typically use either a ceramic interconnect or a thick metallic interconnect. Finally, thin metallic foils suitable for use in the solid oxide fuel cell stacks of this invention are made from commercially available alloys. These alloys are usually off-the-shelf items and are relatively inexpensive.

In accordance with one preferred embodiment of this invention, the metallic foil interconnects of this invention are constructed of a superalloy. A superalloy is a metal alloy resistant to high temperature and typically comprises nickel, iron, chromium, and manganese. Examples of superalloys suitable for use as interconnects in the solid oxide fuel cell stack of this invention include, but are not limited to, austenetic stainless steel, Inconel, Haynes alloys, and Hastealloys.

In accordance with one preferred embodiment of this invention, the solid oxide fuel cell stack comprises end plates 11 which function as current collectors.

EXAMPLE

Cell Fabrication

NiO and 8 mol. % yttria-stabilized zirconia (YSZ) powders were mixed and ball-milled in ethanol for 24 hours. After the well-mixed slurry was dried under vacuum, the powder was die-pressed using steel dies to create channels for a cross-flow arrangement. The amount of powder per plate was approximately 45 grams and the dimensions of the as-pressed cells were approximately 7 centimeters by 7 centimeters in lateral directions and 4 mm in thickness (after uniaxial pressing). The plates were bisqued in air at 1000° C. for one hour. A slurry of YSZ in ethylene glycol was made containing 2 grams of YSZ per 10 ml of ethylene glycol. One side of each NiO+YSZ plate with cross-flow channels was subsequently painted with the YSZ paste. The plates were then sintered in air at 1400° C. for two hours.

LSM ($La_{0.8}Sr_{0.2}MnO_{(3-x)}$) powder, using a mixture of $MnO_2SrCO_3$ and $La_2O_3$, was prepared by calcining in air at 1000° C. for eight hours. YSZ powder was also calcined in air at 1200° C. for one hour to coarsen the particle size. The calcined LSM and YSZ powders were mixed in equal amounts by weight to which ethanol was added. The slurry was subsequently ball-milled. After the powder mixture was dried, the powder was mixed in ethylene glycol in a ratio of 5 grams of LSM +YSZ to 5 ml of ethylene glycol to make a thick paste. The paste was applied on the YSZ-coated side of the sintered plates and they were heated at 400° C. This procedure was repeated until a LSM+YSZ cathode of the desired thickness, about 40–60 microns, was formed. Powder of LSM, without YSZ, in ethanol was ball-milled for 24 hours. After the powder mixture was dried, the LSM powder was mixed in ethylene glycol, 5 grams LSM to 5 ml ethylene glycol, to prepare a thick paste. The paste was applied on the LSM+YSZ painted plates and heated to about 160° C. The procedure was repeated until the desired thickness, about 150–200 microns, of LSM was obtained. Achieving a high enough thickness is important for minimizing the sheet resistance. The painted plates were heated in air to 1210° C. for one hour. The maximum thickness of the cells, thickness varying due to the presence of grooves or channels, was about 3 mm.

Stack Testing

Figure 3:
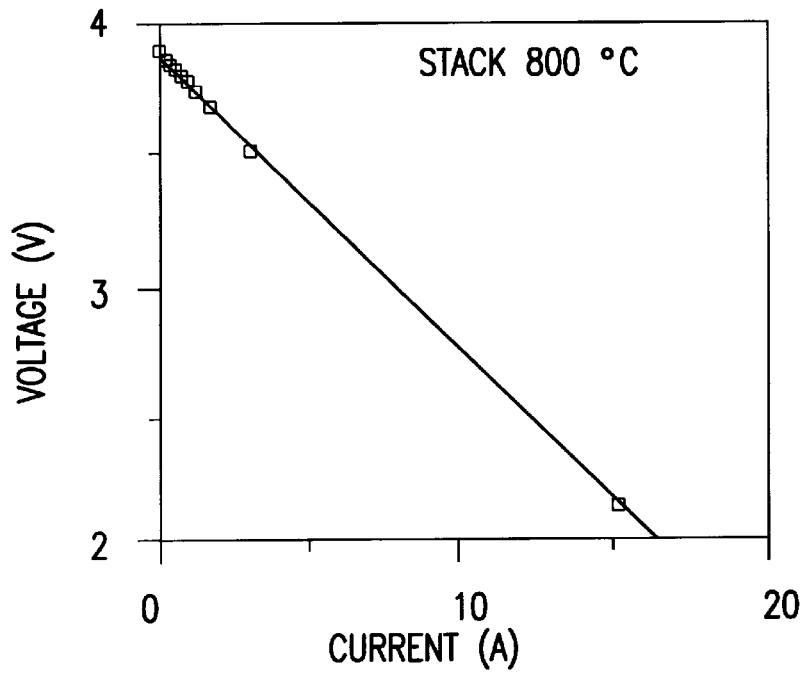
FIG. 3 is a diagram showing voltage versus current for a four fuel cell unit solid oxide fuel cell stack in accordance with one embodiment of this invention.
Figure 4:
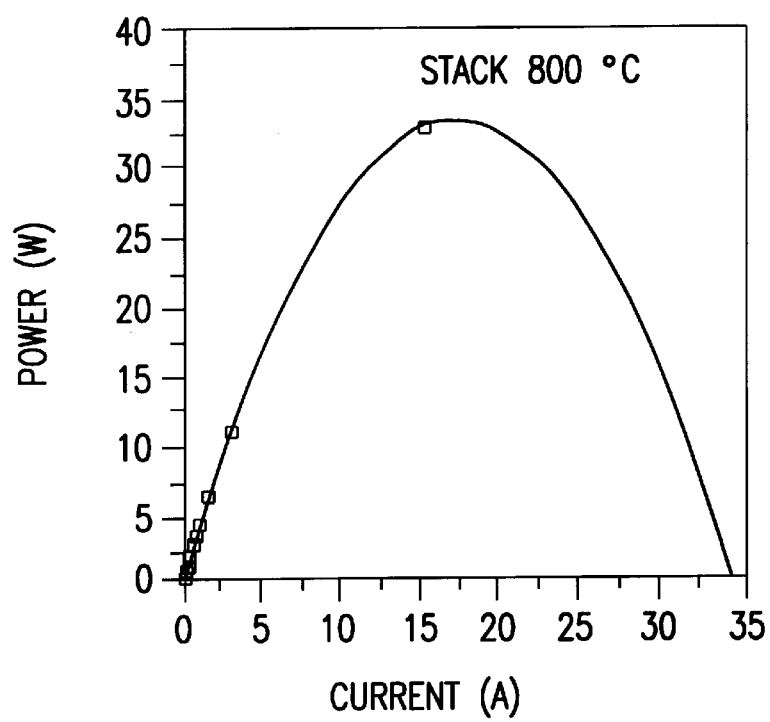
FIG. 4 is a diagram showing power versus current for a four fuel cell unit solid oxide fuel cell stack in accordance with this invention.

A stack was assembled using four integral component fuel cell units and metallic (superalloy) interconnect foils. End plates, which served as current collectors, were also made of a superalloy. The diameter of the current collector rods (See FIG. 2) was 1.27 centimeters. Three voltage probes were introduced, one each attached to an interconnect. The stack was secured inside a metallic manifold with mica gaskets as edge seals. In order to improve the sealing, the stack was spring-loaded wherein the springs were outside the hot zone of the furnace. The stack was tested at 800° C. with humidified hydrogen as the fuel and air as the oxidant. Reduction of NiO to Ni was achieved in-situ. The active area of the cell was estimated to be between 75 and 80 $cm^2$. FIG. 3 shows voltage versus current for the stack and FIG. 4 shows a plot of the total power versus current. The maximum power measured was approximately 33 watts. The area specific resistance of the two inner repeat units (cell-interconnect) was about 0.5 $\Omega cm^2$. The end repeat units had somewhat higher area specific resistances due to a poor contact between the current collectors and the end cells.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

What is claimed is:

1. A solid oxide fuel cell stack comprising:

a plurality of planar integral component fuel cell units, each said planar integral component fuel cell unit comprising a porous anode layer, a porous cathode layer, and a dense electrolyte layer disposed between said porous anode layer and said porous cathode layer;

said porous anode layer forming a plurality of substantially parallel fuel gas channels on an anode surface facing away from said dense electrolyte layer and extending from a first anode side to an opposite anode side;

said porous cathode layer forming a plurality of substantially parallel oxidant gas channels on a cathode surface facing away from said dense electrolyte layer and extending from a first cathode side to an opposite cathode side; and a substantially flat flexible metallic foil interconnect disposed between said porous anode layer and said porous cathode layer of adjacent said integral component fuel cell units.

2. The solid oxide fuel cell stack in accordance with claim 1, wherein said flexible metallic foil interconnect has a thickness in a range of about 1 mil to about 10 mils.

3. The solid oxide fuel cell stack in accordance with claim 1, wherein said flexible metallic foil interconnect comprises a superalloy.

4. The solid oxide fuel cell stack in accordance with claim 3, wherein said superalloy is a metal alloy made of nickel, iron, chromium and manganese.

5. The solid oxide fuel cell stack in accordance with claim 1 further comprising an end plate disposed at each end of said stack, each said end plate serving as a current collector.

6. The solid oxide fuel cell stack in accordance with claim 1, wherein said porous anode layer has a thickness greater than said porous cathode layer.

7. The solid oxide fuel cell stack in accordance with claim 1, wherein said substantially parallel fuel gas channels are substantially perpendicular to said substantially parallel oxidant gas channels.

8. In a solid oxide fuel cell stack comprising a plurality of fuel cell units, each said fuel cell unit comprising a porous anode, a porous cathode, and a dense electrolyte disposed between said porous anode and said porous cathode, an interconnect disposed between said porous anode and said porous cathode of adjacent said fuel cell units, a fuel gas manifold in communication with said porous anode and providing fuel gas to said porous anode, and an oxidant gas manifold in communication with said porous cathode and providing oxidant gas to said porous cathode, the improvement comprising:

each said fuel cell unit being formed as a planar integral component;

said porous anode forming a plurality of substantially parallel fuel gas channels on an anode surface facing away from said electrolyte, said substantially parallel fuel gas channels being in communication with said fuel gas manifold;

said porous cathode forming a plurality of substantially parallel oxidant gas channels on a cathode surface facing away from said electrolyte, said plurality of substantially parallel oxidant gas channels being in communication with said oxidant gas manifold; and said interconnect constructed of a substantially flat flexible metallic foil.

9. The solid oxide fuel cell stack in accordance with claim 8, wherein said flexible metallic foil interconnect has a thickness in a range of about 1 mil to about 10 mils.

10. The solid oxide fuel cell stack in accordance with claim 8, wherein said flexible metallic foil interconnect comprises a superalloy.

11. The solid oxide fuel cell stack in accordance with claim 8, wherein said porous anode layer has a thickness greater than said porous cathode.

12. The solid oxide fuel cell stack in accordance with claim 8, wherein said substantially parallel fuel gas channels are substantially perpendicular to said substantially parallel oxidant gas channels.

13. The solid oxide fuel cell stack in accordance with claim 10, wherein said superalloy is a metal alloy made of nickel, iron, chromium and manganese.

14. In a planar solid oxide fuel cell stack comprising a plurality of fuel cell units, each said fuel cell unit comprising a porous anode, a porous cathode, and a dense electrolyte disposed between said porous anode and said porous cathode, an interconnect disposed between said porous anode and said porous cathode of adjacent said fuel cell units, a fuel gas manifold in communication with said porous anode and providing fuel gas to said porous anode, and an oxidant gas manifold in communication with said porous cathode and providing oxidant gas to said porous cathode, the improvement comprising:

said interconnect constructed of a substantially flat flexible metallic interconnect.

15. The planar solid oxide fuel cell stack in accordance with claim 14, wherein said flexible metallic interconnect has a thickness in a range of about 1 mil to about 10 mils.

16. The planar solid oxide fuel cell stack in accordance with claim 14, wherein said flexible metallic interconnect comprises a superalloy.

17. The planar solid oxide fuel cell stack in accordance with claim 16, wherein said superalloy is a metal alloy made of nickel, iron, chromium and manganese.

18. The planar solid oxide fuel cell stack in accordance with claim 14, wherein each said fuel cell unit is formed as an integral component, said porous anode forming a plurality of substantially parallel fuel gas channels on an anode surface facing away from said electrolyte, said substantially parallel fuel gas channels being in communication with said fuel gas manifold, and said porous cathode forming a plurality of substantially parallel oxidant gas channels on a cathode surface facing away from said electrolyte, said plurality of substantially parallel oxidant gas channels being in communication with said oxidant gas manifold.

19. The planar solid oxide fuel cell stack in accordance with claim 18, wherein said porous anode has a thickness greater than said porous cathode.

20. The planar solid oxide fuel cell stack in accordance with claim 18, wherein said substantially parallel fuel gas channels are substantially perpendicular to said substantially parallel oxidant gas channels.

* * * * *